United States Patent [19]

Hawthorne

[11] Patent Number: 5,768,381
[45] Date of Patent: Jun. 16, 1998

[54] APPARATUS FOR KEY DISTRIBUTION IN AN ENCRYPTION SYSTEM

[75] Inventor: William McMullan Hawthorne, Norwich, England

[73] Assignee: Chantilley Corporation Limited, Buckinghamshire, England

[21] Appl. No.: 615,322
[22] PCT Filed: Sep. 14, 1994
[86] PCT No.: PCT/GB94/02004
§ 371 Date: Mar. 13, 1996
§ 102(e) Date: Mar. 13, 1996
[87] PCT Pub. No.: WO95/08232
PCT Pub. Date: Mar. 23, 1995

[30] Foreign Application Priority Data

Sep. 14, 1993 [GB] United Kingdom ............ 9318976
Mar. 23, 1994 [GB] United Kingdom ............ 9405766

[51] Int. Cl.$^6$ .................................................. H04L 9/08
[52] U.S. Cl. ........................................................... 380/21
[58] Field of Search ................................................ 380/21

[56] References Cited

U.S. PATENT DOCUMENTS

| 4,578,531 | 3/1986 | Everhart et al. | 380/21 |
| 4,607,137 | 8/1986 | Jansen et al. | 380/21 |
| 4,876,716 | 10/1989 | Okamoto | 380/21 |
| 5,136,642 | 8/1992 | Kawamura et al. | 380/21 |
| 5,179,591 | 1/1993 | Hardy et al. | 380/21 |
| 5,253,294 | 10/1993 | Maurer | 380/21 |
| 5,381,481 | 1/1995 | Gammie et al. | 380/21 |
| 5,455,862 | 10/1995 | Hoskinson | 380/21 |
| 5,517,567 | 5/1996 | Epstein | 380/21 |
| 5,666,415 | 9/1997 | Kaufman | 380/21 |

FOREIGN PATENT DOCUMENTS

WO91/12680  8/1991  WIPO .

OTHER PUBLICATIONS

IBM Technical Disclosure Bulletin, Cryptographi Key Distribution for Terminal To Terminal Communications vol. 22, No. 2 Jul. 1979.

Primary Examiner—Salvatore Cangialosi
Attorney, Agent, or Firm—David P. Gordon; David S. Jacobson; Thomas A. Gallagher

[57] ABSTRACT

An encryption/description apparatus enables encrypted communication between two stations each incorporating such an apparatus. The apparatus is arranged when acting as sender to create (at 71) a mutual primitive from stored items of data, to generate a random session key and encrypt the random session key (at 73) in accordance with the mutual primitive for transmission of the encrypted session key to the recipient station. The sender apparatus further encrypts the main message (at 72) in accordance with the random session key for transmission of the encrypted message to the recipient station. The sender apparatus also stores a registration code and transmits this to the recipient station, where it is decoded (at 74) to recreate the mutual primitive from items of data stored at the recipient station. The recipient apparatus decrypts the encrypted session key (at 75), using the recreated mutual primitive, and then decrypts the main message (at 76) using the recreated random session key.

3 Claims, 7 Drawing Sheets

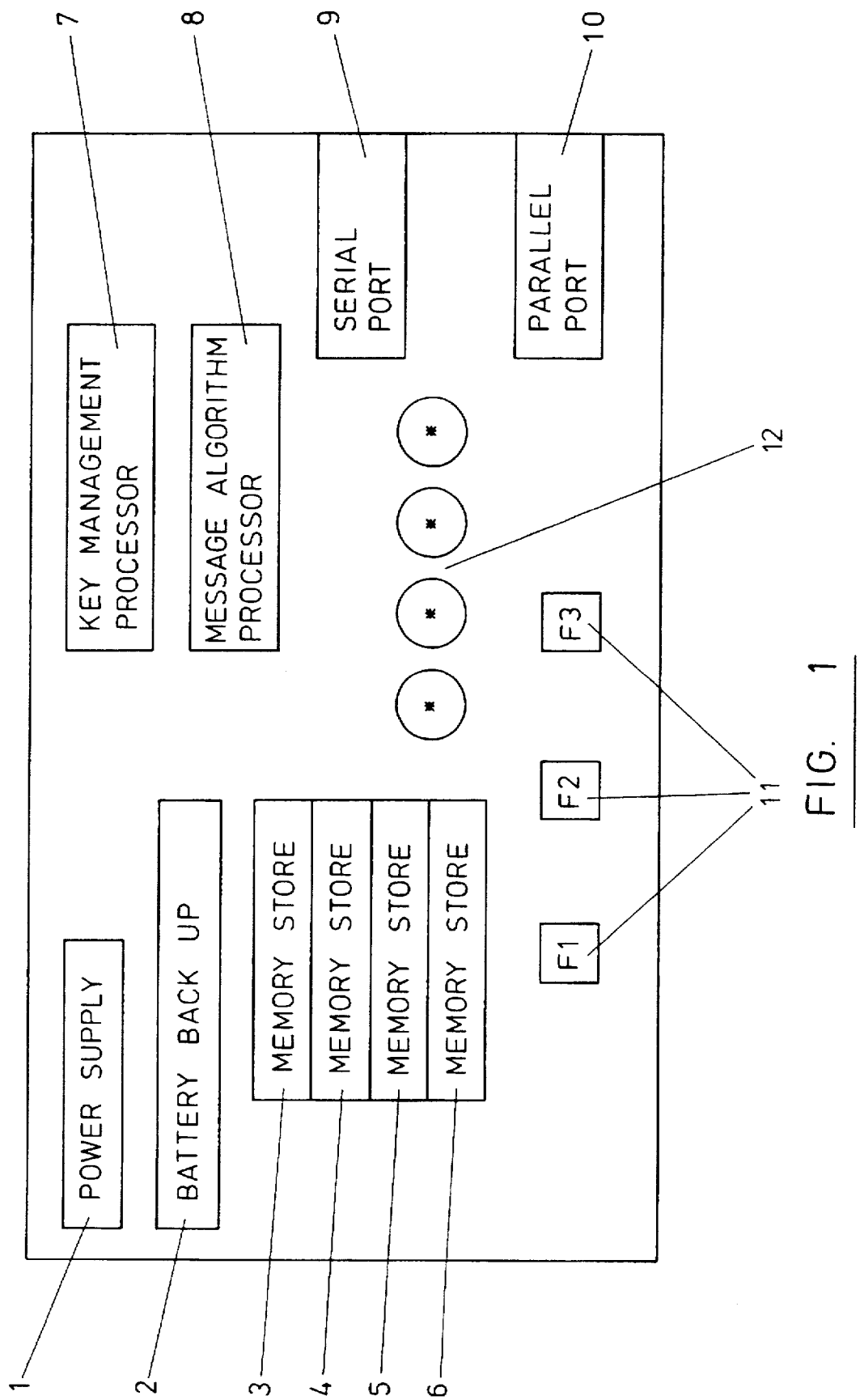

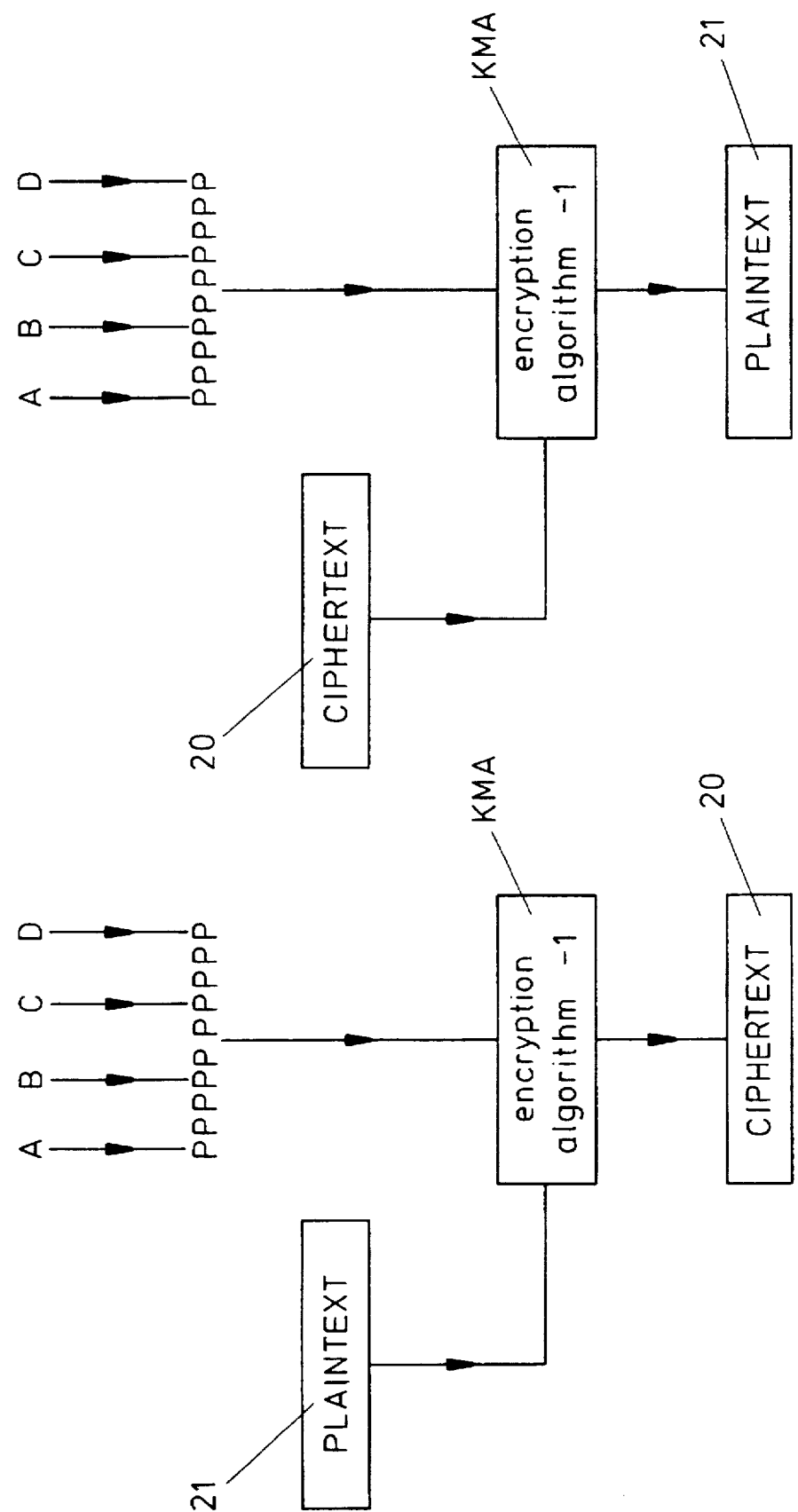

APPARATUS FOR KEY DISTRIBUTION IN AN ENCRYPTION SYSTEM

BACKGROUND OF THE INVENTION

1. Field of the Invention

The present invention relates to arrangements for the automatic encryption and decryption of electronically transmitted messages, particularly in the fields of telephone, facsimile or computer data transmission for example.

2. State of the Art

In general, for the purposes of encrypting transmissions, the message is encrypted in accordance with a selected key. In transmission networks, all key generating systems aim to avoid an exponential growth in the number of encryption keys needed to serve the network, as the number of stations increases. Thus, the number of encryption keys needed is equal to $N(N-1)/2$, where N is the number of stations in the network. If there are 5 stations, the number of keys required (to provide a unique key for each pair of the network) is $5 \times 4/2 = 10$. However, if the number of stations grows to say 1000, the number of encryption keys required is $1000 \times 999/2 = 499500$.

Strong encryption depends upon a frequent change of the encryption key used for the transmission between each pair of stations: preferably the encryption key is changed for each transmission (or session). This then poses difficult problems for the dissemination or distribution of encryption keys in a large network of stations.

One solution to this problem is to provide a key distribution centre (KDC) situated in the network, which by some means distributes encryption keys securely on an ad hoc basis to both the sender and recipient of each transmission. Clearly these encryption keys cannot be sent openly, so the system requires a second level of encryption.

Another, and now generally favoured solution, is a system in which the problem of providing secret key distribution becomes irrelevant because recipient's keys are fixed and publicly known, so that it is only necessary for the sender to look up the recipient's public key (rather like looking up his telephone number), after which security of transmission is safeguarded by the mathematical logic and algorithms used in the message encryption and decryption processes. The outstanding contribution in this field is the system known as the RSA public key encryption system.

In the RSA system, a secure and tamper-proof memory store holds data derived form two very large, secret prime numbers, the product of which is the so-called "public key". The RSA system uses this data for generating encryption keys to allow an independently-designed cypher to transmit information securely between a pair of stations. If the value of either prime number becomes known, all future transmitted messages are breakable (decypherable). Like any other system using fixed keys, the RSA system is secured only by the physical difficulty of accessing the secret data and the complexity of running trial-and-error attempts to break the key.

SUMMARY OF THE INVENTION

In accordance with this invention, there is provided an encryption/decryption apparatus to enable encrypted communication between two stations each incorporating such an apparatus, said apparatus being arranged to create a mutual code from stored items of data, to generate a random session key and encrypt the random session key in accordance with the mutual code for transmission of the encrypted session key to a recipient station, to encrypt a main message in accordance with the random session key for transmission of the encrypted message to the recipient station, and to store a registration code for transmission to the recipient station to enable the recipient station to decode the registration code to thereby recreate said mutual code form items of data stored at the recipient station.

In use the encryption/decryption apparatus at the sender station transmits the encrypted session key and the registration code as preliminary items of data (or headers) to the main message. The encryption/decryption apparatus at the recipient station decodes the registration code to recreate the mutual code, using items of data stored at the recipient station: preferably these items of data include unique identity cods of the recipient station and also codes representing the addresses (e.g. telephone numbers) of the sender and recipient. The recipient encryption/decryption apparatus is then able to decrypt the encrypted session key, in accordance with its recreated mutual code, in order to recreate the random session key. The received encrypted main message can then be decrypted, using the recreated random session key.

At the sender, the items of data, from which the mutual code is created, preferably include unique identity codes of the sender station and also codes representing the addresses (e.g. telephone numbers) of the sender and recipient. Preferably at the sender, the mutual code is formed by an irreversible encryption: an irreversible encryption is achieved in that the encryption key is derived in part form the code to be encrypted—the original code cannot then be recreated form the encrypted code.

Preferably the registration code is created and stored in the sender's encryption/decryption apparatus in an initial registration procedure, in which both sender and recipient make use of a predetermined key which is agreed in advance between the sender and recipient. Thus, preferably the sender apparatus creates the mutual code (as described above) and encrypts this using the agreed key to form a transfer key, which is transmitted to the recipient. The recipient apparatus is able to use the agreed key to decrypt the transfer key in order to recreate the mutual code. The recipient apparatus now encrypts the mutual code in accordance with a further key to create the registration code, which is transmitted back to the sender apparatus for storing in its memory: this further code, used by the recipient apparatus to encrypt the mutual code, preferably uses items of data stored by the recipient apparatus (e.g. including unique identity codes of the recipient and the addresses— e.g. telephone numbers—of both sender and recipient).

Preferably the agreed key is not stored at either sender or recipient, although if it is stored, then after it has been used for the registration procedure, it is erased from memory at both sender and recipient stations. It will be noted that although the mutual code is independently created at both sender and recipient stations (firstly during registration and subsequently during each transmission), it is not retained in memory. Likewise, the transfer key is not stored in either sender or recipient apparatus, and the registration code is stored by the sender only.

The registration procedure is performed a first time to enable a first station, of a given pair of stations, to transmit to the second station of the pair, and must be performed a second time to enable the second station of the pair to transmit to the first. Thus each station will store a registration code enabling it to transit in future to the other station of the pair; but before the station can transmit to any other station in the network, it must undertake a similar registration procedure with each such other station (preferably using a different agreed key in each case).

Embodiments of this invention will now be described by way of examples only and with reference to the accompanying drawings.

BRIEF DESCRIPTION OF THE DRAWINGS

FIG. 1 is a schematic block diagram of an encrypting/decrypting unit included in or associated with each sender/recipient machine;

FIG. 2 is a flow diagram to explain the principles of a symmetric algorithm used to encrypt a message;

FIG. 3 is a similar flow diagram to explain the reverse algorithm used to decrypt an encrypted message;

DETAILED DESCRIPTION OF THE PREFERRED EMBODIMENT

Figure 5:
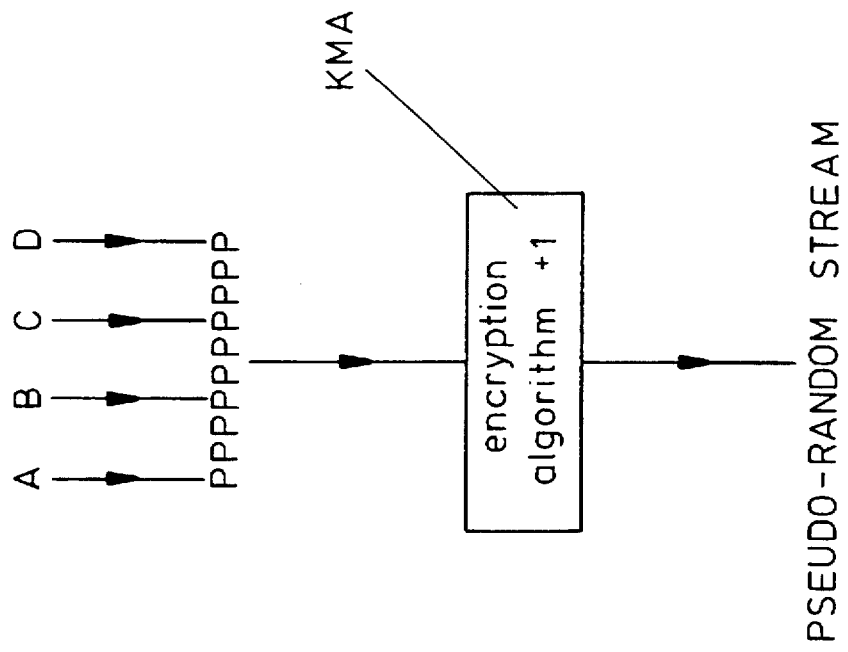
FIG. 5 is a flow diagram to explain the generation of a pseudo-random stream.

Referring to FIG. 1, there is shown an encryption/decryption unit incorporated in or associated with the transmitter/receiver machine at each station of a communications network. Each such unit comprises a power supply terminal 1 for use where power is not supplied by the host machine, an optional battery back-up 2 to maintain power to the unit's memory in the event of loss of mains power, first and second memory stores 3, 4 holding data programmed into the unit at manufacture, a memory store 5 holding data supplied by data sources in communication with the unit, and a memory store 6 holding data programmed into the unit at installation and immediately prior to use. The unit further comprises a microprocessor 7 which runs a key management algorithm (KMA), and a microprocessor 8 which runs a message encryption algorithm (MEA), which may be a DES (data encryption standard) or other proprietary encryption algorithm. The unit also comprises a serial data port 9 for use when the unit is connected between a data terminal and a modem, and a parallel data port 10 for use when the unit is connected to a device for transmitting additional data. Control keys 11 include a power on/off switch and a mode selection keys. Coloured display lights 12 indicate power on/off and the various modes selected by the selection keys 11.

The key management algorithm (KMA) operates substantially as a stream cypher algorithm: the characteristics of a stream cypher will now be explained.

Stream cyphers are well-known in the encypherment art and spring from a principle first established by Vigenere in the sixteenth century. In modern form, a pseudo-random stream is derived using a key from a plurality of smaller numbers, so-called primitives. A simple example of encypherment using a pseudo-random stream, and based on the 26 letters of the alphabet, illustrates the principle:

| Plain message | E | N | E | M | Y | | A | T | T | A | C | K |
|---|---|---|---|---|---|---|---|---|---|---|---|---|
| Pseudo-random stream | 16 | 3 | 25 | 19 | 7 | | 13 | 21 | 0 | 3 | 16 | 9 |

The plain message is encyphered by adding the successive numbers of the stream to numbers representing the successive characters of the plain message (the latter numbers being allocated on the basis of A=0, B=1 ... Z=25), giving in this case the encyphered message:

U Q D F F N O T D S T

Note for example that M=12, so M+19=31, and 31=(25)+5, 5=F.

This message is decrypted by subtracting the successive numbers of the same pseudo-random stream from the numbers representing the successive characters of the encyphered message. The cypher is therefore symmetric, in that the same primitives are used to generate the same pseudo-random stream for encryption or decryption.

FIGS. 2 and 3 schematically show the principles of the stream cypher used in the key management algorithm KMA by the processor 7. A plurality of primitives are derived from a variables A, B, C, D ... and used to form a pseudo-random stream PPPPP .... The variables A, B, C, D ... might include a fax number, a 100 character string, even a short message, or the output of an earlier encryption procedure. Provided the values of the variables A, B, C, D ... remain unchanged and the algorithm is altered from "addition" (+1 i.e. encryption) to "subtraction" (−1 i.e. decryption), then wilst FIG. 2 provides an encyphered text 20 from plaintext 21, FIG. 3 represents the inverse of FIG. 2 and reforms the original plaintext 21 from the encyphered text 20.

Figure 4:
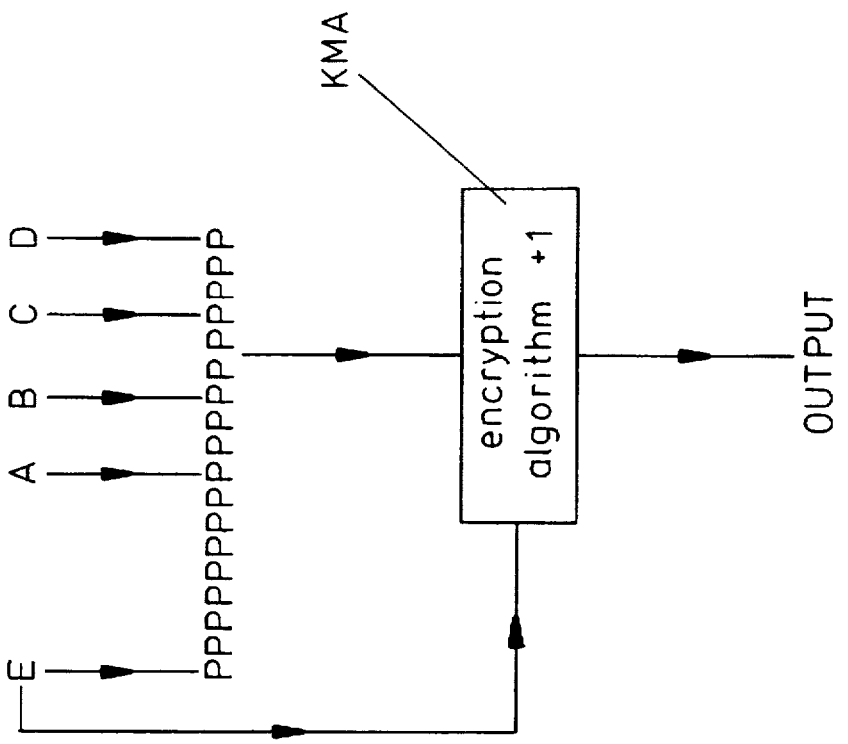
FIG. 4 is a flow diagram to explain the irreversible encryption of a message.

However, instead of the reversible mode illustrated by FIGS. 2 and 3, the key management algorithm may be used in an irreversible mode: that is to say, an encryption procedure can be performed, but the inverse procedure cannot logically occur. Thus, referring to FIG. 4, one of the primitives for the pseudo-random stream is derived from a variable E which also forms the plain message to be encrypted: it is therefore impossible to recreate the plain message E; thus for decryption, the primitive derived from E is unknown and the pseudo-random stream cannot be formed, so that the encryption is irreversible.

In accordance with this invention, it is necessary for the encryption/decryption units at the two stations to undergo a registration procedure to enable them subsequently to communicate with each other. The procedure in this registration mode will now be described with reference to FIG. 6.

The registration procedure makes use of a 56-character randomly-generated secret code (Unique Identity String S) which has been programmed into the memory store 3 of the sender unit, and a 12-character randomly-generated code (Unique Crypt String S) which has been programmed into the memory store 4. Primitives are derived from the sender's and recipient's addresses (ADS-S and ADS-R) and from the sender's Unique Identity String S and Unique Crypt String S, and a pseudo-random stream PPPP ... is generated from these primitives. The Unique Crypt String S also forms the message which is now encrypted at 61 using the key management algorithm (KMA+1) and, because the Unique Crypt String S is used both as the message and to derive one of the primitives, the encryption is irreversible: the output is termed here the Mutual Primitive. Next this Mutual Primitive is encrypted at 62 by a one-time key using the key management algorithm (KMA+1) to form a Transfer key, which is then transmitted to the recipient station.

The encryption/decryption unit at the recipient station now uses the one-time key and the key management algorithm (KMA−1) at 63 to decrypt the Transfer key and so re-create the Mutual Primitive. For this purpose, both sender and recipient must agree the one-time key in advance, using a separate communication medium: for example if the communication medium which is required to be encyphered is facsimile, the one-time key may be agreed by means of a telephone conversation over a different telephone line, or through the postal service.

Next the unit at the recipient station generates a pseudo-random stream from primitives derived from the recipient's and sender's addresses (ADS-R and ADS-S) and from its own Unique Identity String R and Unique Crypt String R: this stream is used at 64 to encrypt the Mutual Primitive, using the key management algorithm (KMA+1), to form a Registered Crypt String, which is then transmitted in plain to the sender station and stored in its memory store 5, along with the recipient's address, for use in future automatic communications between these particular two stations.

Figure 7:
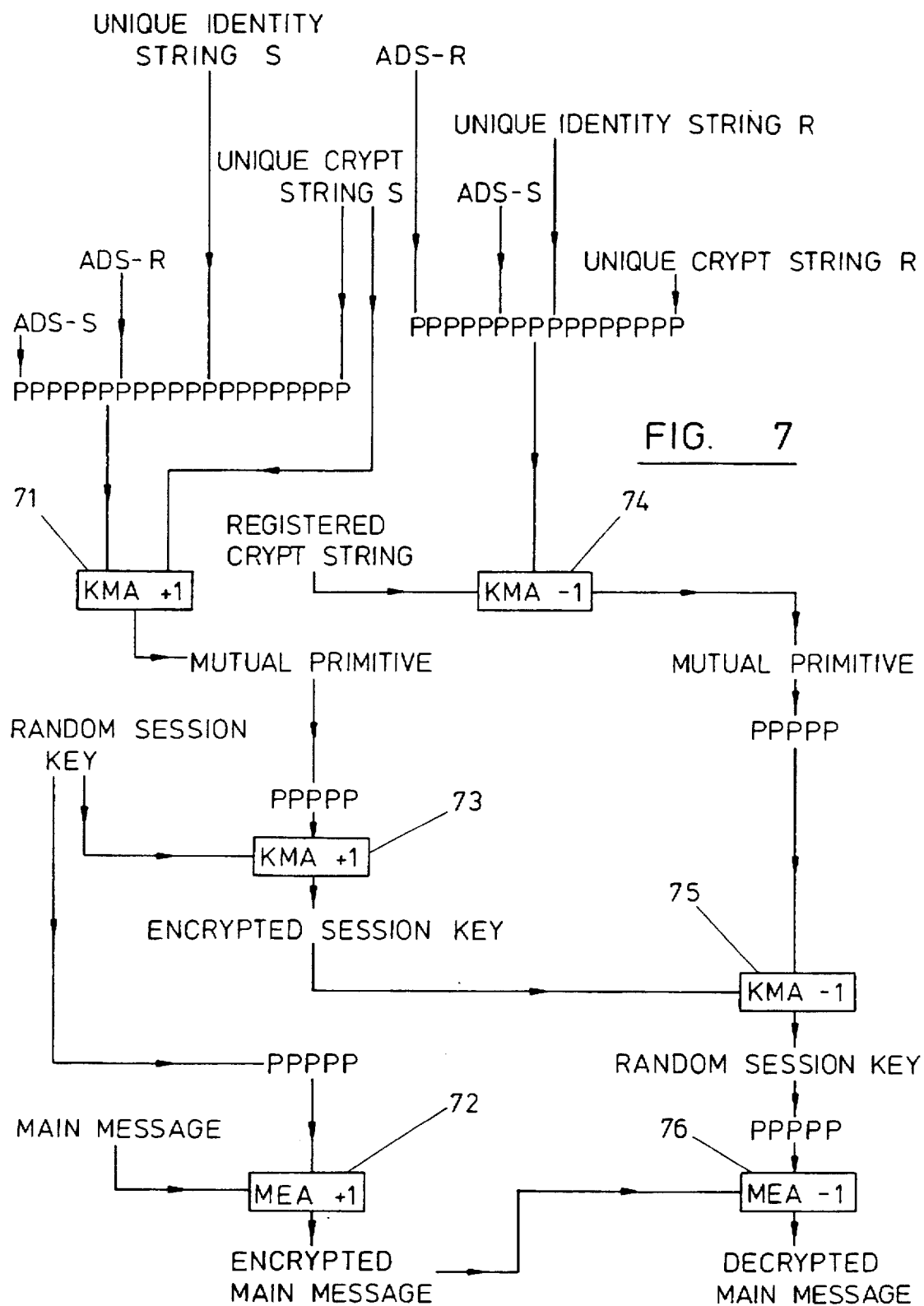
FIG. 7 is a flow diagram to explain the operation of the encrypting/decrypting units at sender and recipient stations for automatic, encrypted communication.

The registrations process has stored the Registered Crypt String in the sender's unit, and both stations will subsequently be able to recreate a mutual secret (the Mutual Primitive) to enable future automatic but encrypted communications between the two stations. The Mutual Primitive is not however stored in either sender or recipient unit, or if it is temporarily stored it is erased after its use in the registration procedure. The automatic communication mode will now be described with reference to FIG. 7.

The sender station creates the main message, which is to be encrypted at the sender unit, then to be transmitted in securely encrypted form to the recipient station, and to be decrypted at the recipient station to re-create the main message. In order to do this, the following steps are carried out.

The sender unit re-creates the Mutual Primitive, using the key management algorithm (KMA+1) at 71 to encrypt the Unique Crypt String S using the pseudo-random stream generated by primitives derives (as previously) from the sender's and recipient's addresses (ADS-S and ADS-R), the Unique Identity String S and the Unique Crypt String S. The sender's key management algorithm also at 72 creates a random session key, which is then used to encrypt the main message using a message encryption algorithm (MEA+1), to form the encrypted main message.

The random session key is also encrypted by the Mutual Primitive at 73 using the key management algorithm (KMA+1), to form the encrypted session key. The registered crypt string and the encrypted session key are transmitted, as headers to the encrypted main message, to the recipient station.

The recipient station unit re-creates the pseudo-random stream from the primitives derived from the recipient's and sender's addresses (ADS-R and ADS-S) and the recipient's Unique Identity String R and Unique Crypt String R. This pseudo-random stream decrypts the registered crypt string at 74 using the key management algorithm (KMA−1), to re-create the Mutual Primitive. This re-created Mutual Primitive de-crypts the encrypted session key at 75, again using the key management algorithm, to-recreate the random session key at the recipient. The recipient unit now has the essential key (the random session key) required to decrypt the main message, at 76.

It will be appreciated that a fresh session key will be generated for each new transmission. Indeed, even within a given transmission (or session), the session key can be changed periodically, e.g. after predetermined intervals of time or, in the case of a facsimile transmission, at the end of each page (or even at the end of each line) of a transmitted text.

It will be appreciated that, in registration mode, double registration is required between each pair of stations, first one station acting as sender and the other as recipient and then these roles being exchanged, so that communication in either direction can be carried out subsequently. There is little sacrifice of security if the same one-time key is used for both registrations between the same pair of stations.

In the case of managed networks, for example a network of branch offices of a back, all potential users of the system are known at the time of installation of the network. For these cases, preferably the encryption/decryption unit is arranged to enable an automatic registration procedure, eliminating the need for each pair of stations to devise and exchange one-way keys. This automatic registration operates as follows.

Figure 8:
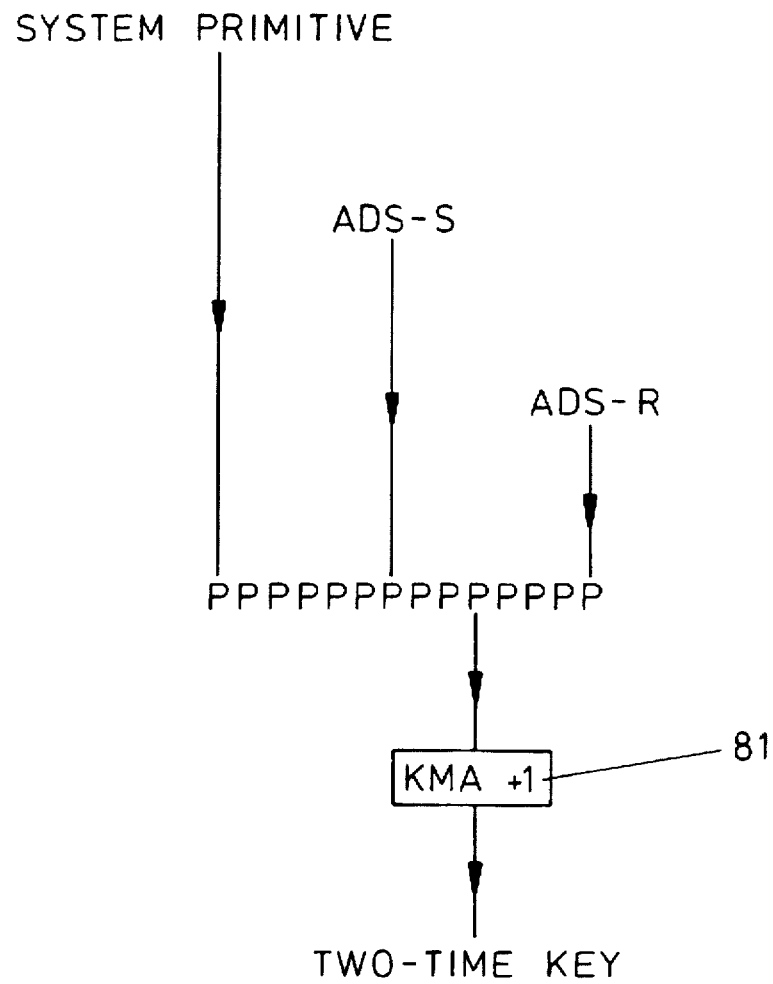
FIG. 8 is a flow diagram to explain the generation of a two-time key.

A master version of the key management algorithm is run on a processor, e.g. a PC, which is separate from the network, and operates as shown in FIG. 5 to produce a pseudo-random stream which is used to derive a two-time key for each pair of stations: the key is called a two-time key because it serves as a key for a two-way registration procedure between the relevant pair of stations. FIG. 8 shows how the two-time key is created, namely by applying the key management algorithm at 81 to a pseudo-random stream based on a system primitive and primitives derived form the addresses of the two stations (ADS-S and ADS-R).

Memory store 6 of each encryption/decryption unit then stores a set of two-time keys, needed for registration of that unit with each of the other units in the network. For example in the case of a network of 1000 stations, the memory store 6 of each encryption unit stores 999 two-time keys, each of six figures.

Figure 6:
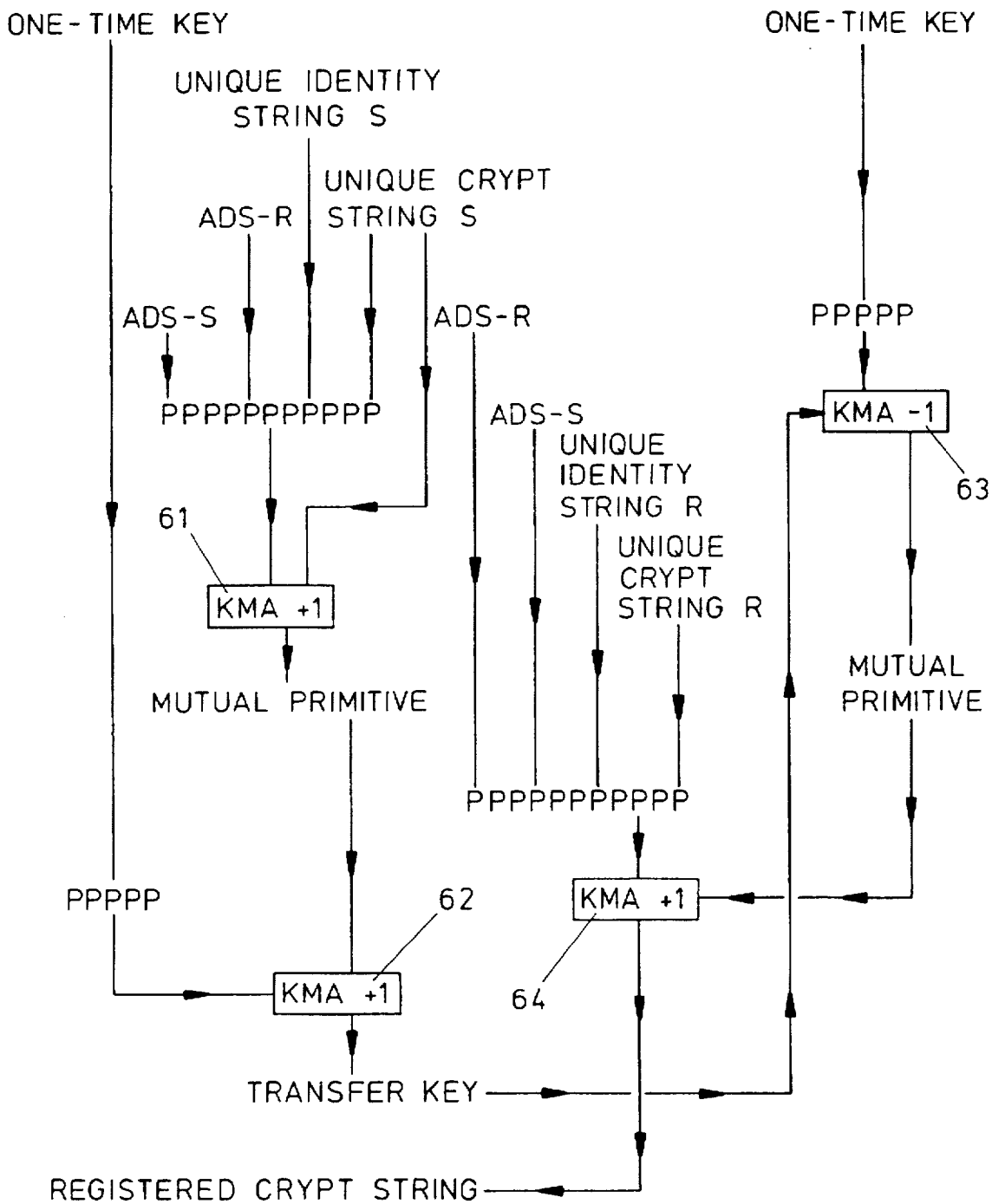
FIG. 6 is a flow diagram to explain the operation of encrypting/decrypting units at sender and recipient stations for the purposes of mutual registrations.
Figure 9:
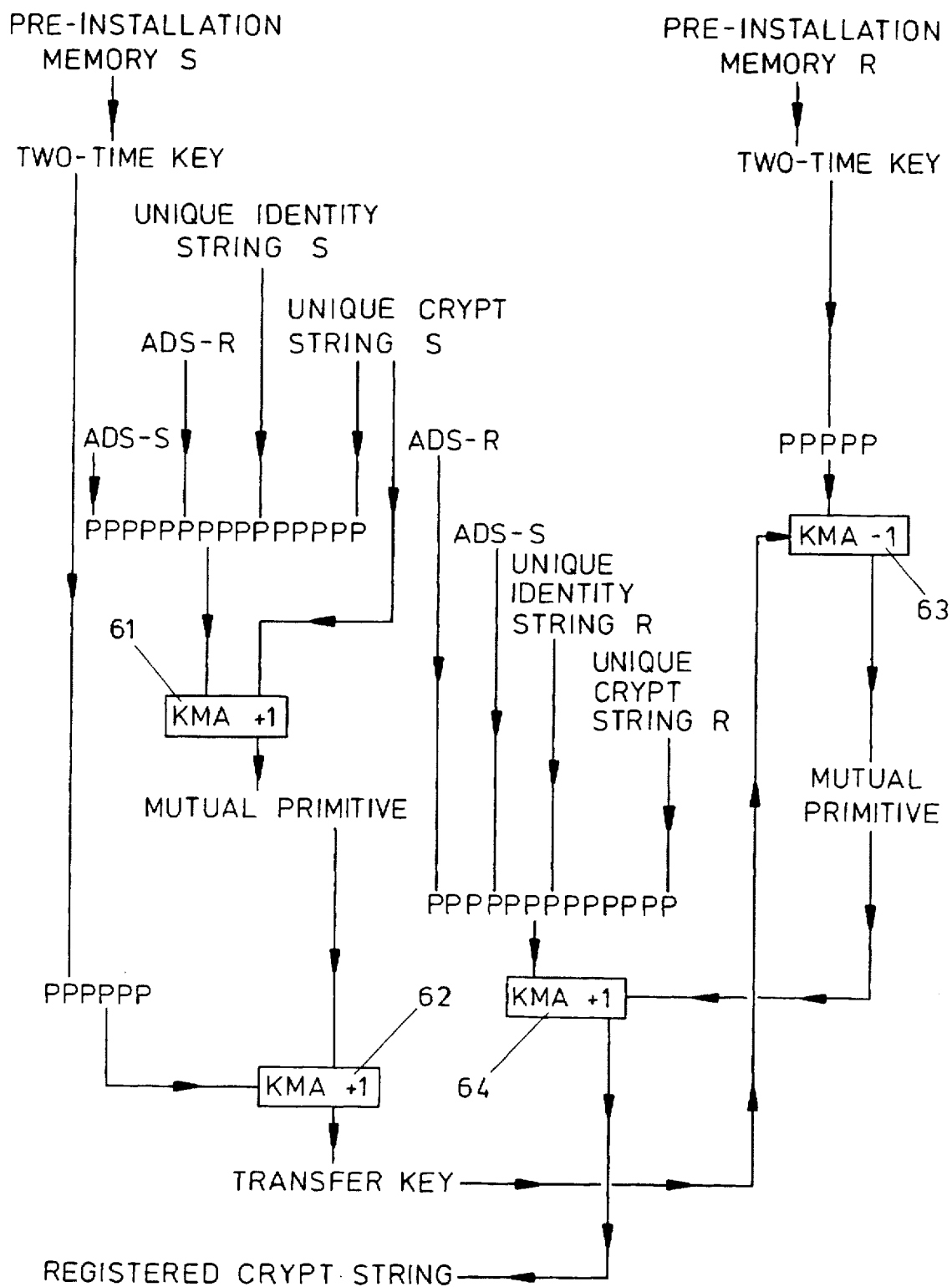
FIG. 9 is a flow diagram to explain the operation of encrypting/decrypting units at the sender and recipient stations for the purposes of automatic registrations.

Automatic registration will now be further explained with reference to FIG. 9: the similarity to FIG. 6 will be noted and corresponding reference numerals are used. In automatic registration suppose one unit, acting as sender, wishes to register with another unit. The sender unit searches for the appropriate two-time key, and recognizes three possible conditions. In the first condition, the relevant two-time key has not yet been used for registration: the two stations proceed with registration generally as set out in FIG. 9, the registration thus enabling future transmission from the one unit to the other. In the second condition, the sender unit finds that the relevant two-time key has been used once before: the second registration is now performed, with the roles of sender and recipient being reversed. Now that the two-time key has been used twice, and therefore fulfilled its purposes, each of the pair of units erases the relevant two-time key from its memory store 6. In the third condition, the unit finds that the relevant two-time key has already been used twice and erased from memory: the relevant pair of units will therefore proceed with automatic encyphered communication.

It will be appreciated that the present invention avoids the need, which is common in prior art systems, for an exchange to take place between sender and recipient, prior to transmission of the encrypted message, in order that the recipient will know the session key to be used. Thus, the invention involves a once-and-for-all registration procedure, which then holds good for all future transmissions but still different session keys are used at different times. In particular, all initiatives prior to a transmission involve the sender only: the sender's message is complete in itself and contains all the necessary information for the recipient to convert the message to plain. The only information which is required to be securely protected is a pair of unique identifiers (the unique identity string and the unique crypt string), and in practice both these may be contained in a single string. All other information is either created afresh with each transmission (the mutual primitive) or has no secrecy value (the registered crypt string).

I claim:

1. An encryption/decryption apparatus to enable encrypted communication between two stations, each operable as a sender and a recipient and each incorporating such an apparatus, said apparatus being operable in both registration mode and in encrypted communication mode, said apparatus comprising:

a) memory means for storing a first set of data items which include first secret data items and also storing a second set of data items which include second secret data items;

b) means for entering a pre-agreed key into said encryption/decryption apparatus;

c) means for sender registration including means for creating a mutual code from said first set of data items, means for encrypting said mutual code using said pre-agreed key to form a transfer key, and means for transmitting said transfer key to a recipient, said means for sender registration operable when said apparatus is acting as sender in registration mode;

d) means for recipient registration including means for decrypting a received said transfer key using said pre-agreed key to recreate said mutual code, means for deriving a further key from said second set of data items, means for encrypting said recreated mutual code in accordance with said further key to thereby create a registration code, and means for transmitting said registration code to a sender, said means for recipient registration operable when said apparatus is acting as recipient in registration mode;

e) means for receiving and storing said registration code from the recipient, said means for receiving and storing operable when said apparatus is acting as sender in registration mode;

f) means for sender communication including means for recreating said mutual code from said first set of data items, means for generating a random session key, means for encrypting said random session key in accordance with said mutual code, means for transmitting said encrypted random session key and said registration code to the recipient, and means for encrypting a main message in accordance with said random session key and transmitting said encrypted main message to the recipient, said means for sender communication operable when said apparatus is acting in encrypted communication mode as sender to the recipient with which registration has been made; and g) means for recipient communication including means for decrypting said registration code received from the sender using said second set of data items to thereby recreate said mutual code, means for decrypting said encrypted random session key received from the sender using said recreated mutual code, and means for decrypting said encrypted main message received from the sender using said decrypted random session key, said means for recipient communication operable when said apparatus is acting as recipient in encrypted communication mode.

2. An apparatus according to claim 1, wherein when said apparatus is acting as sender in encrypted communication mode, said means for sender communications is arranged to transmit the encrypted random session key and registration code related to the recipient as items of data preliminary to the encrypted main message.

3. An apparatus according to claim 1, wherein when said apparatus is acting as one of sender in registration mode and sender in encrypted communication mode, said means for creating said mutual code is arranged to form the mutual code by an irreversible encryption.

* * * * *